Nov. 17, 1970     H. E. GRANT     3,540,069

AUTOMOBILE SIDE AND REAR WINDOW WASHER

Filed Aug. 20, 1968     4 Sheets-Sheet 1

INVENTOR.
HOWARD E. GRANT
BY
ATTORNEYS

Nov. 17, 1970    H. E. GRANT    3,540,069
AUTOMOBILE SIDE AND REAR WINDOW WASHER
Filed Aug. 20, 1968    4 Sheets-Sheet 2

INVENTOR.
HOWARD E. GRANT
BY
ATTORNEYS

Nov. 17, 1970 H. E. GRANT 3,540,069
AUTOMOBILE SIDE AND REAR WINDOW WASHER
Filed Aug. 20, 1968 4 Sheets-Sheet 3
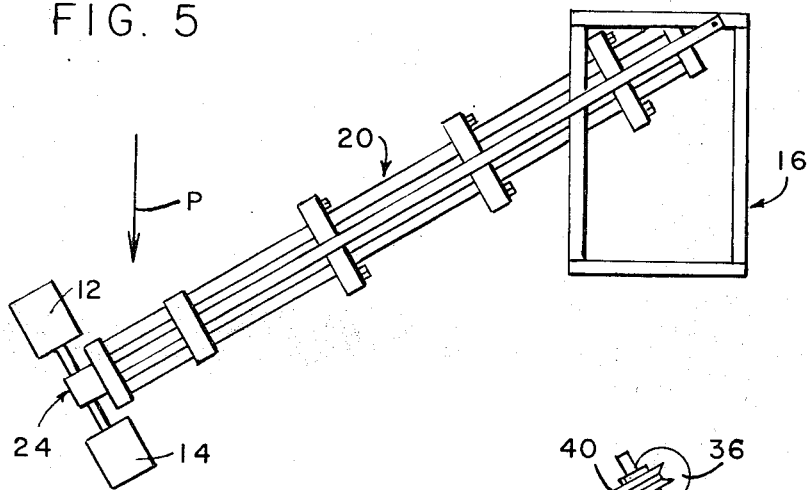
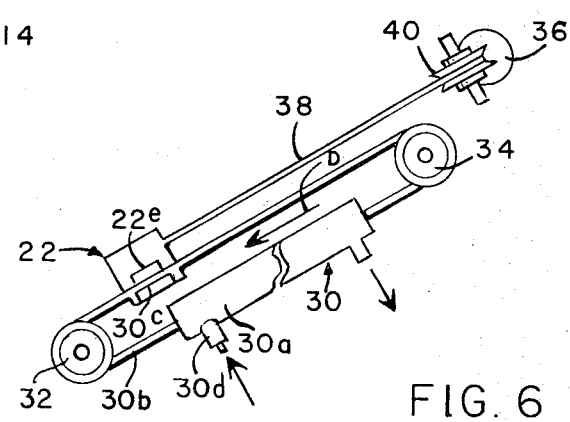
INVENTOR.
HOWARD E. GRANT
BY
ATTORNEYS

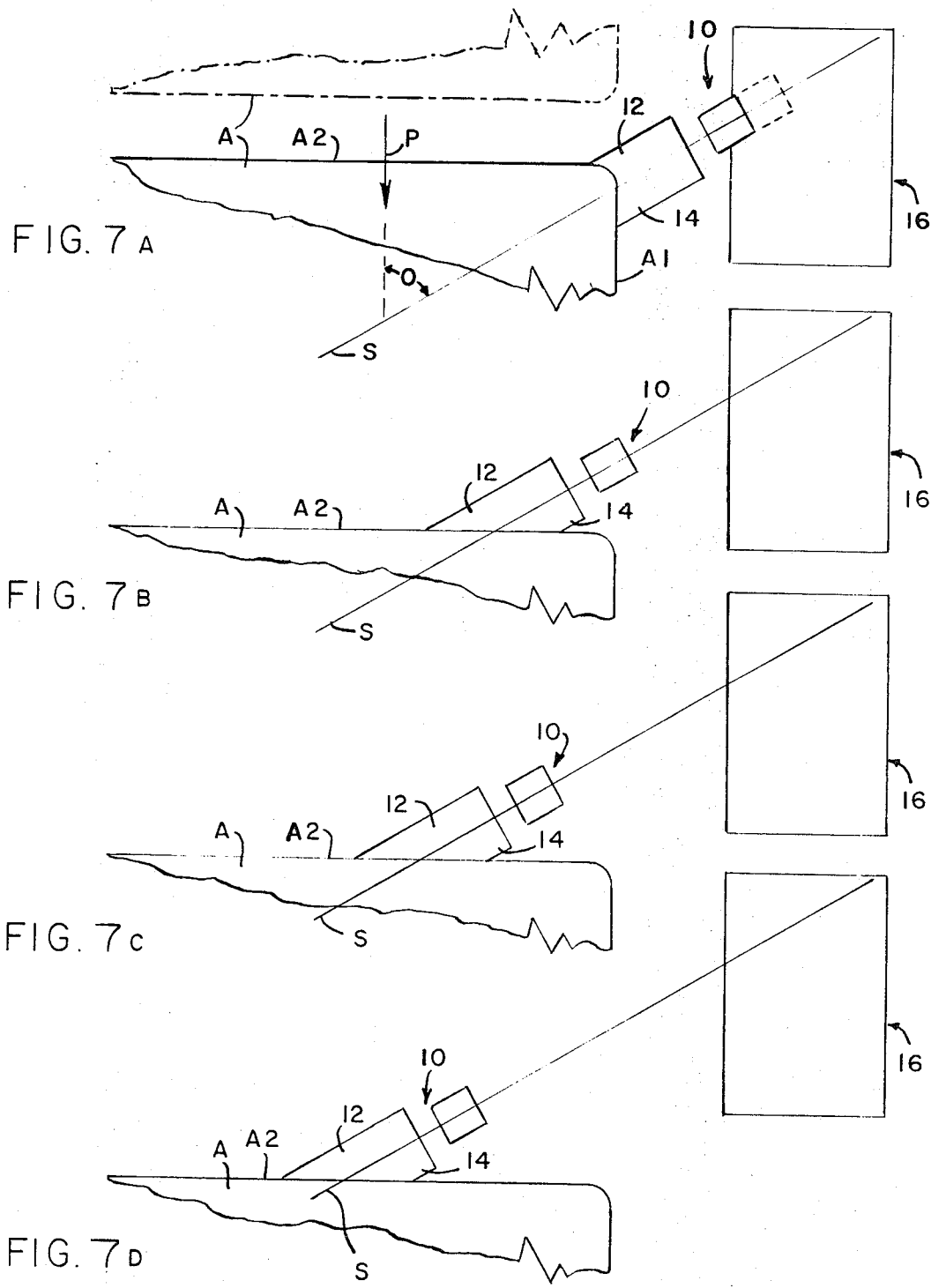

United States Patent Office
3,540,069
Patented Nov. 17, 1970

3,540,069
AUTOMOBILE SIDE AND REAR WINDOW WASHER
Howard E. Grant, c/o Trans-World Car Wash Systems, Inc., 65 Marine St., Farmingdale, N.Y. 11735
Filed Aug. 20, 1968, Ser. No. 753,956
Int. Cl. B60s 3/06
U.S. Cl. 15—21
7 Claims

ABSTRACT OF THE DISCLOSURE

For use in a car or automobile washing unit in the operation of which an automobile is moved along a prescribed path in association with various apparatus for cleaning different parts of the automobile, a side and rear window washer including at least one brush movably mounted on an overhead support which extends into the automobile path of movement so that the brush, during a cleaning interval, makes cleaning contact with the automobile and, more particularly, as the automobile moves past the washer, the angular orientation of the brush is such that the brush has a wiping stroke transversely across the automobile rear window.

---

The present invention relates generally to automobile washing units in the operation of which use is made of various apparatus intended for cleaning different parts of the automobile, and more particularly to an improved automobile side and rear window washer.

In current use are numerous embodiments of automobile washing units which have in common a mode of operation wherein the automobile is urged along a path of movement in association with different apparatus strategically located and designed to clean a different part of the automobile. Consistent with the popularity and proven commercial acceptance of these units, there is a continuing effort by equipment manufacturers to provide improved car cleaning apparatus, particularly that designed to clean the automobile rear window which, due to its rearward location, is somewhat inaccessible to cleaning contact by the cleaning brush. The cleaning brush must initially, of course, have a clearance position permitting movement of the car alongside of it and then subsequently be moved against and maintain its cleaning contact with the automobile rear window as the automobile continues its movement along its path of movement. During this critical time, prior art window washers fail to supply sufficient support or contact pressure between the brush and car window to achieve a desired vigorous scrubbing action.

Broadly, it is an object of the present invention to provide an improved automobile side and rear window washer overcoming the foregoing and other shortcomings of the prior art. Specificallly, it is an object to provide a cleaning brush having subsequent cleaning positions, in each of which it has the proper and favorable position and orientation for cleaning the automobile rear window and the cumulative effect of which is to provide the brush with a wiping stroke transversely across the rear window.

An automobile side and rear window washer demonstrating objects and advantages of the present invention includes a support having an overhead clearance position above the automobile path of movement and arranged at a slightly inclined angle in the direction of movement along the path, and means supporting a brush in a depending relation from the overhead support so as to be movable therealong, the angular orientation being effective to both bring the brush into contact with the rear window and cause its progressive movement across the rear window.

The above brief description, as well as further objects, features and advantages of the present invention, will be more fully appreciated by reference to the following detailed description of a presently preferred, but nonetheless illustrative embodiment in accordance with the present invention, when taken in conjunction with the accompanying drawings, wherein:

FIG. 5 is a diagrammatic view best illustrating the orientation of the cleaning apparatus with respect to the automobile path of movement;

FIG. 6 is similarly a diagrammatic plan view of the apparatus illustrating the operative portions thereof which provide the movement for the cleaning brushes;

Figure 2:
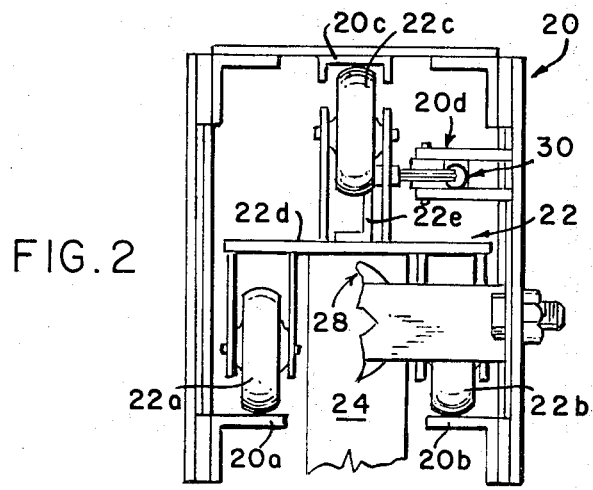
FIG. 2 is a partial side elevational view, on an enlarged scale, showing details of a cooperating trolley and guide rails which provide the degree of movement of the cleaning brushes relevant to the automobile path of movement.

FIGS. 7A–D are simplified diagrammatic plan views of the apparatus depicting positions of movement thereof with respect to an automobile during its positions of movement in a typical cleaning interval, namely, to wit:

FIG. 7A illustrates the automobile both in phantom perspective at a position of movement approaching the apparatus and also, in full line, at a subsequent position of movement at which the automobile and cleaning brushes are starting a cleaning stroke tranversely across the automobile rear window;

FIGS. 7B–D, inclusive, illustrate the automobile in progressive positions of movement along its path of movement and the cleaning brushes in its related progressive positions of movement.

Reference is now made to the drawings and in particular to FIG. 1 and FIGS. 7A–D, the former illustrating a preferred embodiment of an automobile window washer 10 according to the present invention and the latter figures diagrammatically illustrating the related positions of movement of the washer 10 and of an automobile A as it partakes of movement along a path of movement P past the washer 10. That is, as will be explained in greater detail subsequently, the window washer 10 includes, as clearly illustrated in FIG. 1, a pair of cleaning brushes 12, 14, which are operatively arranged on a depending support so as to be movable as best illustrated in the diagrammatic illustrations of FIGS. 7A–D, from a clearance position adjacent the path of movement P into subsequent cleaning positions in which the cleaning brushes 12, 14 are projected into the path of movement P and therefore into cleaning contact with the automobile A. Specifically, as illustrated in phantom perspective in FIG. 7A, as the automobile A approaches the window washer 10 the operative cleaning portion thereof occupies a clearance position off to the side of the path of movement P. Movement of the front portion of the automobile A is effective to actuate a starting switch (not shown) of the window washer 10 which results in movement of the cleaning brushes 12, 14 against the side of the automobile A, specifically designated A1 in FIG. 7A. Ultimately, the automobile A progresses to a position of movement, as illustrated in full line in FIG. 7A, where the side A1 clears the apparatus 10 and the automobile rear, specifically designated A2 in FIG. 7A, is presented for cleaning to the appartus 10.

By progressive examination of FIGS. 7A and 7B, it can be readily seen that as the automobile A moves further along the path of movement P, the brushes 12, 14 also move further along the overhead support of the window washer 10 and thus further into the path of movement P. The significant result of these simultaneous movements of the automobile A and cleaning brushes 12, 14 is that the brushes 12, 14 partake of a wiping stroke transversely across the automobile rear portion or window A2. This transverse wiping stroke is completed by continued movements of the automobile A and brushes 12, 14, as illustrated in FIGS. 7C and 7D.

Figure 1:
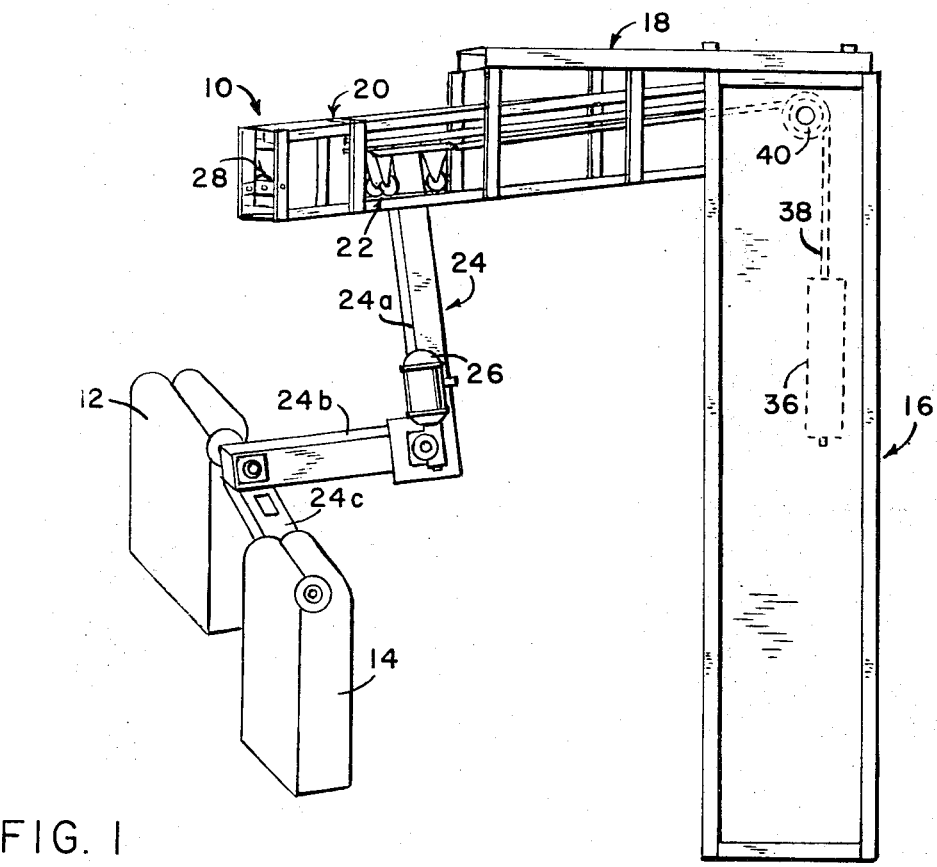
FIG. 1 is a front elevational view of an automobile window washer illustrated in a cleaning position of movement in which the brushes thereof are projected into the automobile path of movement.
Figure 3:
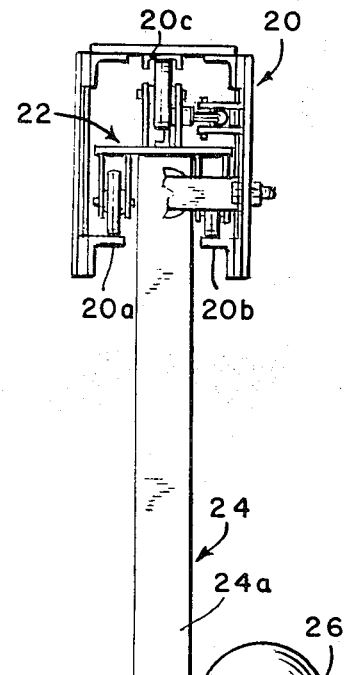
FIG. 3 is a view similar to FIG. 2 including the cleaning brushes and its depending support.
Figure 4:
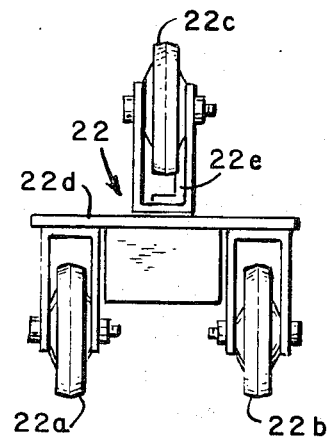
FIG. 4 is an isolated elevational view of the trolley.

At this convenient point in the description it should be noted and understood that the overhead support for the brushes 12, 14, in the embodiment illustrated in FIG. 1, is represented by the reference line identified as S in FIGS. 7A–D and that structural member S, which effectively defines the path of movement for the brushes 12, 14, subtends an acute angle 0 with the path of movement P. It is this angular orientation, preferably set at sixty degrees, which favorably positions the cleaning brushes 12, 14 in relation to the automobile rear surface A2 so that a wiping stroke transversely across this rear surface is possible as the automobile A moves slowly past the window washer 10 along its path of movement P.

Turning now to the preferred embodiment of the window washer 10 as illustrated in FIGS. 1–6, the same includes an upright main support 16 which, as may best be appreciated from FIG. 5, is located off to one side of the automobile path of movement P. As best illustrated in FIG. 1, extending laterally from an upper portion of the main support 16, at the previously noted angle of orientation 0, is an outer frame 18 which in turn supports an elongated overhead support 20 which, as clearly illustrated, occupies a clearance position above the automobile path of movement P with its longitudinal extent subtending the previously noted acute angle 0 with the automobile path of movement P. For brevity sake, only the structural features of the overhead support 20 which are significant to the present invention are herein described and include, as best illustrated in FIG. 2, a pair of lower guide rails 20a, 20b, which together with a centrally located upper guide rail 20c cooperate with strategically located wheels 22a, 22b, and 22c of a trolley 22 operatively arranged to partake of movement in opposite directions along the longitudinal extent of the overhead support 20, within the elongated, generally rectangular interior of this support. Appropriately connected to the trolley 22 is a depending L-shaped brush support 24 which, at approximately the juncture of its legs 24a, 24b has an appropriate bracket for mounting a motor 26 which is operatively arranged to drive the previously noted brushes 12, 14. Specifically, the brush support leg 24b will be understood to be a hollow housing having appropriately entrained on supporting sprockets therein an endless driving chain operatively connected to the motor 26 at the input end, and at the output end, connected to the support shaft 12a of the brush 12. As generally understood, rotation of the shaft 12a produces corresponding rotation of the body of the brush 12, diagrammatically illustrated in the drawings but fabricated of numerous, lengths of stringy yarn such as is conventionally used, for example, in mops. Movement of the rotating brush body 12 against an automobile area or window produces the desired cleaning of the area or window.

As illustrated in FIG. 1, the window washer 10 is preferably a two-brush embodiment and accordingly, for the second brush 14, there is an additional depending and slightly inwardly inclined housing 24c which similarly contains an endless chain drive which taps off rotational power from the drive for the brush 12 and, has as an output a connection to a support shaft 14a for the brush 14.

Trolley 22, in addition to having conventional structure for rotatably mounting the previously noted wheels 22a–c, includes, as best shown in FIG. 2, a flat plate-like body 22d on which there is appropriately secured, behind the upper wheel 22c, a connecting bracket 22e which is operatively connected to appropriate means for moving the trolley 22 from its starting position adjacent the main support 16 to its furthest extending position along the overhead support 20 at which it contacts an elastomeric bumper 28. This drive means, as may be best understood from the diagrammatic illustration of FIG. 6 in conjunction with FIG. 2, includes a conventional piston cable 30 such as is commercially available from Tool-O-Matic Corporation of Minneapolis, Minnesota. This piston cable is oriented with the cylinder 30a thereof aligned lengthwise on the overhead support 20 on support brackets 20d and with the endless cable 30b thereof appropriately entrained about end pulleys 32, 34 also appropriately journaled for rotation on the support structure 20d. In the loop of the cable 30b there is a connecting bracket 30c which is appropriately connected, as by bolts or the like, to the previously noted trolley bracket 22e. As a consequence, under the influence of pressure air introduced into the piston inlet 30d, the endless cable 30b is driven in a counterclockwise direction D during a power stroke of the cable piston 30 and, as a consequence, the trolley 22 and the brushes 12, 14, move along the overhead support 20 into an operative cleaning position in which the brushes 12, 14 make cleaning contact with an automobile being moved along the automobile path of movement P. Movement of the trolley 22 in the direction D is against the opposition of a counterweight 36 connected to one end of a cable 38 disposed over a sheave 40 and, at its other end, connected to the trolley 22. The weight of counterweight 36 will be understood to be of an extent which is slightly greater than the weight of the depending support 24 and brushes 12, 14 so that under the influence of the counterweight 36, and when the cable piston 30 is inoperative, the trolley 22 is retracted along the guide rails 20a–c within the overhead support 20 thereby moving the brushes 12, 14 into a starting clearance position adjacent the automobile path of movement P. During a cleaning interval, however, initiated when the automobile A, as illustrated in phantom perspective in FIG. 7A, strikes or trips a sensing device as it approaches the window washer 10, the cable piston 30 is rendered operative and pressure air is introduced into the inlet 30d to cause movement of the trolley 22 in the direction D in opposition to the counterweight 36. This movement, as already explained, results in the cleaning brushes 12, 14 making cleaning contact with the automobile A so that the automobile side A1 is first cleaned and, as the automobile A continues its progressive movements along the path of movement P, the cleaning brushes 12, 14 then also complete a wiping stroke transversely across the automobile rear portion 18.

A latitude of modification, change, and substitution is intended in the foregoing disclosure and in some instances some features of the invention will be employed without a corresponding use of other features. Accordingly, it is appropriate that the appended claims be construed broadly and in a manner consistent with the spirit and scope of the invention herein.

What is claimed is:

1. In an automobile washing unit of the type having means for moving an automobile along a path of movement in association with cleaning apparatus, an automobile window washer comprising an elongated, overhead support operatively arranged in a clearance position above said automobile path of movement and oriented with the longitudinal extent thereof subtending an acute angle with said automobile path of movement, and brush means supported in a depending position from said overhead support operatively arranged to be movable therealong, during a cleaning interval, from a starting clearance position adjacent said automobile path of movement through subsequent cleaning positions as determined by said angular orientation of said overhead support into said automobile path of movement, whereby said brush means is adapted to make cleaning contact transversely across the rear window of said automobile.

2. An automobile window washer as defined in claim 1 including a counterweight of an extent and operatively arranged to counterbalance the weight of said brush means and to normally urge said brush means into said starting clearance position thereof.

3. An automobile window washer as defined in claim 2 including air piston means operatively arranged to oppose said counterweight and selectively urge said brush means from said starting cleaning position through subsequent cleaning positions during a cleaning interval when an automobile is located adjacent said window washer.

4. An automobile window washer as defined in claim 3 wherein said overhead support has guide rails therealong and said brush means includes a trolley operatively arranged for movement along said guide rails so as to partake of movement into said automobile path of movement during a cleaning interval.

5. In an automobile washing unit of the type having means for moving an automobile along a path of movement in association with cleaning apparatus, an automobile window washer comprising an upright main support located adjacent said automobile path of movement, an elongated overhead support operatively arranged on said main support in a clearance position above said automobile path of movement and oriented with the longitudinal extent thereof subtending an acute angle with said automobile path of movement, a trolley selectively operatively arranged for movement along said overhead support and at least one brush supported in a depending position from said trolley so as to be operatively movable, during a cleaning interval, from a starting clearance position adjacent said automobile path of movement through subsequent cleaning positions as determined by said angular orientation of said overhead support into cleaning contact with an automobile when being moved along said automobile path of movement, whereby said brush is adapted to make cleaning contact transversely across the rear window of said automobile.

6. An automobile window washer as defined in claim 5 including a counterweight of an extent and operatively arranged to counterbalance the weight of said brush and said trolley supporting the same and to normally urge said brush and trolley into said starting clearance position thereof.

7. An automobile window washer as defined in claim 6 including air piston means operatively arranged to oppose said counterweight and selectively urge said brush on trolley from said starting cleaning position through said subsequent cleaning positions.

References Cited

UNITED STATES PATENTS

| | | | |
|---|---|---|---|
| 3,304,565 | 2/1967 | Fuhring | 15—21 |
| 3,421,169 | 1/1969 | Hergonson | 15—21 |
| 3,432,870 | 3/1969 | Emanuel et al. | 15—21 |

EDWARD L. ROBERTS, Primary Examiner

U.S. Cl. X.R.

15—53